United States Patent
Jose et al.

(10) Patent No.: US 11,663,060 B2
(45) Date of Patent: May 30, 2023

(54) SHARED MESSAGE MANAGEMENT

(71) Applicant: International Business Machines Corporation, Armonk, NY (US)

(72) Inventors: James Jose, Bangalore (IN); Amar Shah, Salisbury Park (IN); Ajay Ponnappan, Bangalore (IN); Maya Anilson, Bangalore (IN); Nilima Srivastava, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/342,531

(22) Filed: Jun. 8, 2021

(65) Prior Publication Data

US 2022/0391272 A1   Dec. 8, 2022

(51) Int. Cl.
*G06F 9/54* (2006.01)
(52) U.S. Cl.
CPC .................... *G06F 9/546* (2013.01)
(58) Field of Classification Search
CPC ..................................................... G06F 9/546
See application file for complete search history.

(56) References Cited

U.S. PATENT DOCUMENTS

| 6,493,716 | B1 * | 12/2002 | Azagury | ............... G06F 9/546 |
| 7,467,388 | B2 | 12/2008 | Driver | |
| 8,763,012 | B2 | 6/2014 | Hosie | |
| 2010/0250684 | A1 * | 9/2010 | Naish | ............... H04L 67/60 |
| | | | | 709/201 |

OTHER PUBLICATIONS

WebSphere Message Broker—Message Flows; Version 6 Release 1; 2010; 1890 pages (Year: 2010).*
Concurrency in Java; May 2, 2003; 34 pages (Year: 2003).*
Anonymous, "Enhancement of Message Queue Systems to Tightly Control Publisher and Subscriber Access through 'Locking'" IP.com, Disclosure No. IPCOM000263036D, Jul. 23, 2020, 5 pages, <https://priorart.ip.com/IPCOM/000263036>.
Anonymous, "Peeking Mechanisms for Messaging Queues with Server-Side Consumer and Message Tracking," IP.com, Disclosure No. IPCOM000264450D, Dec. 18, 2020, 16 pages, <https://priorart.ip.com/IPCOM/000264450>.
Mitchell, "Handling Failure Successfully in RabbitMQ," Medium, Jan. 30, 2017, 6 pages, <https://medium.com/codait/handling-failure-successfully-in-rabbitmq-22ffa982b60f>.
Reeder, "Asynchronous Messaging Patterns," MuleSoft Blog, Oct. 10, 2019, 7 pages <https://blogs.mulesoft.com/api-integration/patterns/asynchronous-messaging-patterns/>.

* cited by examiner

*Primary Examiner* — S. Sough
*Assistant Examiner* — Kimberly L Jordan
(74) *Attorney, Agent, or Firm* — Eric W. Chesley

(57) ABSTRACT

A call for communication is detected between applications, where the call requires input from a plurality of threads of the applications via editing of a single control message in a queue such that the single control message reflects data from each of the applications. An attempt by a first of the plurality of threads to edit the single control message is detected while a second of the plurality of threads is editing the single control message. A message is sent to the first of the plurality of threads that details a status of the single control message in response to detecting the attempt. The call for communication is responded to using the single control message in response to detecting that each of the plurality of threads has edited the single control message.

17 Claims, 4 Drawing Sheets

SHARED MESSAGE MANAGEMENT

BACKGROUND

Given the increasing interconnectivity of computing devices and data stores, within computer science there is an increasing need for high performance inter-process communication (IPC). IPC typically relates to techniques and mechanisms by which numerous applications (which may be referred to as clients that request data and servers that respond to client requests) share data. One such technique used for IPC is a message queue. A message queue may be used for inter-thread communication (e.g., communication between a plurality of processing threads), where different applications use a queue in which content (and/or the ability to modify that content) is exchanged between applications accessing the queue.

SUMMARY

Aspects of the present disclosure relate to a method, system, and computer program product relating to managing shared messages in a messaging queue. For example, the method includes detecting a call for communication between applications that requires input from a plurality of threads of the applications via editing of a single control message in a queue such that the single control message reflects data from each of the applications. The method further includes detecting an attempt by a first of the plurality of threads to edit the single control message while a second of the plurality of threads is editing the single control message. The method further includes sending a message to the first of the plurality of threads that details a status of the single control message in response to detecting the attempt. The method further includes responding to the call for data using the single control message in response to detecting that each of the plurality of threads has edited the single control message. A system and computer program product configured to execute this method are also described herein.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
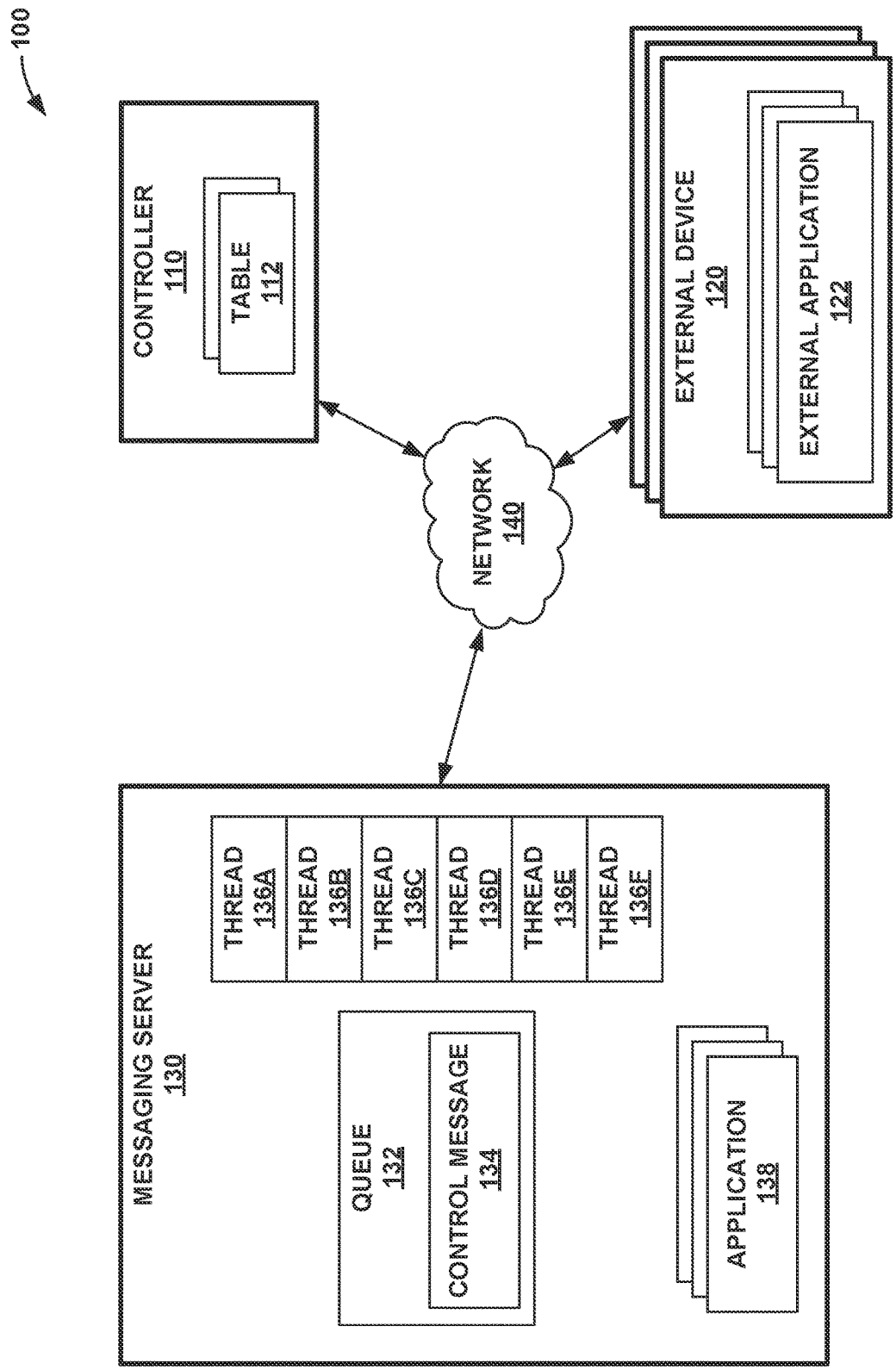
FIG. 1 depicts a conceptual diagram of an example system in which controller may manage a control message within a queue that is shared among a plurality of applications.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to managing communication in a shared messaging system, while more particular aspects of the present disclosure relate to using one or more tables to manage a control message that is shared via a queue between applications by indicating to other threads when a message is being edited by a given thread and scheduling future edits by other threads. While the present disclosure is not necessarily limited to such applications, various aspects of the disclosure may be appreciated through a discussion of various examples using this context.

Modern computing systems often include processes in which input from a plurality of applications is required. One technique that is used enables asynchronous communication between applications using a "message queue" in which a "sender" application can deposit a message within a queue, such that other "receiver" application(s) can gather and process this message, subsequently putting the edited message back in the queue upon completion. A messaging server (e.g., a computing device that provides the message queue functionality described herein) can provide application programming interfaces (APIs) that enable the message to be placed in the queue and recalled from the queue. For example, a messaging server may provide a "put" API that allows a sender application to create a new message in the queue, a "browse" API that enables applications to read the contents of a message that is present in the queue, a "get" call that takes a predetermined amount of time attempting to collect and remove the message from the queue on behalf of a requesting receiver application, or the like.

Being as in many situations a single message is intended to reflect input from a plurality of applications, the message queue is set up such that a message in a message queue can only be accessed (and therein processed/updated/edited) by a single processing thread at a time. In this way, the queue acts as the storage unit for the message as one or more receiver applications gather the message from the queue in sequence. This often results in scenarios where a message put into the queue by a sender application needs to be processed/updated by multiple threads to complete the transaction. Conventional message queues may use numerous techniques to execute these sequential transactions, such as a fan-out, fan-in technique, where multiple requests are sent out to respective clients (e.g., applications) in a fan-out step, and then multiple replies are received (e.g., received via threads) that are then merged in sequence into the single response message (e.g., a control message in the message queue). In some examples, the control message in the message queue may be generated once the requests are sent to each of the clients. The control message may include data on the requests sent to the clients, such as information on what data is requested, how many requests were sent out, etc.

In conventional systems, there may be techniques to increment a count with each update to the control message until a number that equals the total amount of detected requests is reached. For example, in a conventional system, a respective thread may request updating the control message and accordingly increment a count associated with the control message (to reflect this update). For example, there could be dozens or hundreds of replies from external applications that dozens or hundreds of local processing threads are attempting to process (e.g., by updating the same control message). Each of these threads may attempt to do this by, e.g., using a "get" API to gather the control message in the message queue (therein removing the control message from the queue), reading the current value of a "number of received replies" value within the control message, increment (e.g., adding one to) this value, processing this control message per the reply received by the thread, and then putting the control message back into the queue.

However, in many situations, dozens or hundreds of other threads may be attempting to gather the control message while another thread is accessing and updating the control message. In a conventional system, while one thread is accessing the control message (e.g., while increment the count), other threads attempting to gather the control message (e.g., via a "get" API call) may take a non-trivial amount of time (e.g., 50 milliseconds, or 100 milliseconds, or 300 milliseconds) spinning while trying to access the control message, before returning with a generic error message (e.g., a NO MESSAGE AVAILABLE error). In such situations, these threads may be technically incapable of determining whether or not the control message that they are searching for even exists, if it is being processed by other threads, or any information at all about the control message or the status of the queue, and moreover each attempt that it makes to find out takes a non-trivial amount of time in which other tasks cannot be executed. As such, in conventional systems, threads may repeatedly bombard the target with "get" calls until threads finally get through (which may be a drain on network resources and/or processing resources), threads may incorrectly conclude that the control message does not exist (therein creating a new control message resulting in duplicate control messages with inconsistent data, or otherwise permanently quitting the task and therein causing an incomplete dataset), threads may delay for long periods of time between "get" calls (which may result in a long time to complete the process), or other such suboptimal solutions.

Aspects of this disclosure may solve or otherwise address some or all of these problems of conventional systems. For example, aspects of the disclosure may be configured to detect a thread looking for a control message that is not in the queue, and responsively inform the requesting client whether the control message is created, not created, being processed by other threads, or the like. Aspects of the disclosure may further be configured to cut a "get" call short to immediately inform a thread that a current attempt to access the control message will not be successful (therein saving time and processing capabilities), as well as scheduling a future time to release the control message to a specifically scheduled thread that are configured to wait for such release within a waiting period (e.g., via a "callback" function as described herein). A computing device that includes a processing unit executing instructions stored on a memory may provide the functionality that addresses these problems, this computing device herein referred to as a controller. The controller may keep track of which threads are expected for what purposes, and when these threads have successfully updated the control message.

Though this controller is discussed as executing much of the functionality described herein, in other examples much or all of this functionality may be executed by a messaging server itself. Put differently, though controller is largely discussed as being provided by a standalone computing device for the sake of clarity, in other examples the controller may be integrated into the messaging server, or integrated into some other application hosting device described herein, while providing the functionality described herein that is described as relating to the controller. For example, the controller may be integrated into the messing server and may automatically determine the purpose of "get" requests when they are received (e.g., to determine which thread is requesting access, potential times that the control message will be unavailable for, if the thread is planning to consume and then put back the control message or consume and then permanently delete the control message, etc.). Specifically, the controller may determine details of a requested access via the "get" request from the threads for the control message, where these details as provided by the threads within the request regard a manner in which the threads will interact with the control message in response to these threads being given access to the control message.

In other examples, the controller may schedule one or more threads for a time in the future in which they can access the control message. For example, the controller may gather data from each thread regarding how long they intend to keep the control message for, and generate a schedule (e.g., a first in, first out (FIFO) ordered schedule) that identifies a future time window for each thread requesting access to the control message while the control message is unavailable. If a thread requests access to the control message at a point in time in which other threads will have the control message for at least some threshold period of time, the controller may inform the thread of a future time window in which the processing thread will receive the control message from controller, or a time at which the processing thread is to execute a new "get" call to access the control message. In certain examples, the controller may forcefully pass access from one thread to the next. For example, where a first thread informs the controller that the first thread will take 200 milliseconds with the control message but does not return the control message after 250 milliseconds, the controller may release/free the control message for the next scheduled thread and block the delaying first thread from eventually providing its edited control message (e.g., instead scheduling the first thread to capture and edit a subsequent version of the control message in a new future time window). Alternatively, in certain examples the controller may affirmatively provide the control message via one mechanism or another to a scheduled thread.

For example, FIG. 1 depicts environment 100 in which controller 110 manages communication of a plurality of threads that are communicating using shared messages. For example, controller 110 may manage communication that occurs on messaging server 130, such as one or more control messages 134 in queue 132. Controller 110 may manage communication as a plurality of threads 136A-136F (collectively, "threads 136") attempt to access and process control message 134 within queue 132. Though six threads 136 for a single control message 134 are depicted in FIG. 1, it is to be understood that the number and arrangement of all of these components are provided for purposes of illustration only, and that any number of threads 136 for a single respective control message 134 (e.g., where controller 110 manages communication regarding to numerous individual control messages 134) are consistent with this disclosure.

The communication that is managed by controller 110 may be between a plurality of software applications 138, where threads 136 may be executing instructions on behalf of applications 138. Though applications 138 are depicted as being hosted on messaging server 130 for purposes of illustration, in some examples some or all of threads 136 may be executing instructions on behalf of one or more external applications 122 hosted on external devices 120 that are external to messaging server 130. Both external devices 120 and messaging server 130 may be a computing device similar to what is depicted in FIG. 2.

Figure 2:
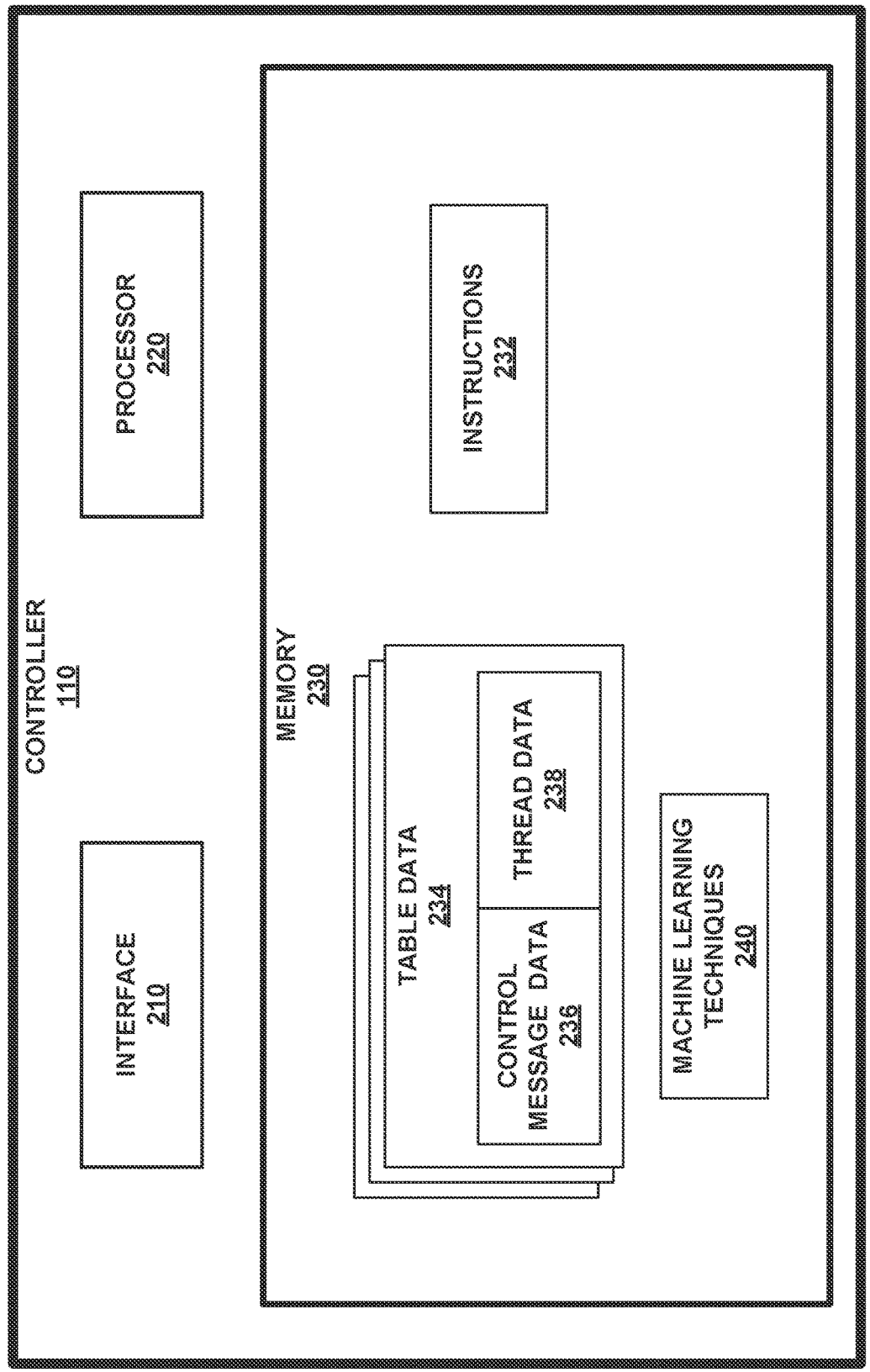
FIG. 2 depicts a conceptual box diagram of example components of the controller of FIG. 1.

Controller 110 may include a processor coupled to a memory (as depicted in FIG. 2) that stores instructions that cause controller 110 to execute the operations discussed herein. Though controller 110 is depicted in FIG. 1 as being separate from messaging server 130 for purposes of illustration, in other examples controller 110 may be a subcomponent of messaging server 130, and/or controller 110 and messaging server 130 may be interchangeable in some other manner to execute the functionality described herein.

Controller 110 and external applications 122 of external devices 120 may communicate with messaging server 130 over network 140. Network 140 may include a computing network over which computing messages may be sent and/or received. For example, network 140 may include the Internet, a local area network (LAN), a wide area network (WAN), a wireless network such as a wireless LAN (WLAN), or the like. Network 140 may comprise copper transmission cables, optical transmission fibers, wireless transmission, routers, firewalls, switches, gateway computers and/or edge servers. A network adapter card or network interface in each computing/processing device (e.g., controller 110, external device 120, and/or messaging server 130) may receive messages and/or instructions from and/or through network 140 and forward the messages and/or instructions for storage or execution or the like to a respective memory or processor of the respective computing/processing device. Though network 140 is depicted as a single entity in FIG. 1 for purposes of illustration, in other examples network 140 may include a plurality of private and/or public networks over which controller 110 may manage a single control message 134 to be accessed by a plurality of threads 136 as described herein.

Controller 110 may manage communication using one or more tables 112. For example, controller 110 may track, using tables 112, a current status of control message 134. The current status may include whether or not control message 134 is created, which of threads 136 is currently accessing control message 134, a planned duration for which a respective thread 136 will be accessing control message 134, or the like. In some examples, controller 110 may further update table 112 to include planned future events regarding control message 134. For example, if thread 136A was accessing control message 134 in an ongoing time window while thread 136B attempted to access control message 134, controller 110 may schedule thread 136B to access/edit control message 134 in a first future time window that immediately follows the ongoing time window. Similarly, if thread 136C attempts to access control message 134 during the ongoing time window and shortly after thread 136B attempts to access/edit control message 134, controller 110 may schedule thread 136C for a second future time window that immediately follows the first future time window. In some examples, controller 110 may maintain two or more of tables 112 for control message 134, such as a first table 112 for a current status of control message 134 and a second table 112 for future scheduling of edits to control message 134. Further, as used herein, an "edit" to control message 134 may include any operation by one of threads 136 in which a single respective thread 136 takes control message 134 out of queue 132 in order to execute an operation.

Controller 110 may respond to attempts from threads 136 to access the control message 134 with a status gathered from tables 112. For example, after detecting a call from one application 122 to a plurality of applications 138 for input to control message 134 within queue 132, controller 110 may detect a request to access control message 134 before control message 134 is created (not depicted). In such a situation, controller 110 may respond to an attempt to access control message 134 from thread 136A with a status such as "NO MSG CREATED." For example, controller 110 may respond to such an attempt by identifying that both control message 134 is not in queue 132 and that also that tables 112 indicate that none of threads 136 are currently accessing control message, in response to which controller 110 identifies (and provides a status detailing) that control message 134 has not been created. In response to this status, thread 136A may wait for a period of time for control message 134 to be created, and/or thread 136A may itself create control message 134 (though in other examples other entities may generate control message 134 in response to such a determination).

Controller 110 may maintain tables 112 such that tables 112 only include ongoing or future information. For example, as soon as thread 136A completes a process of editing control message 134 and therein returning control message 134 to queue 132, controller 110 may delete relevant records from table 112 relating to thread 136A editing control message 134. Specifically, controller 110 may delete "old" data from tables 112 within a millisecond or two of this data becoming obsolete. By maintaining table 112 such that only ongoing or future information is stored, controller 110 may increase a change of a status being provided to threads 136 regarding control message 134 being accurate and timely.

As described above, controller 110 may include or be part of a computing device that includes a processor configured to execute instructions stored on a memory to execute the techniques described herein. For example, FIG. 2 is a conceptual box diagram of such computing system 200 of controller 110. While controller 110 is depicted as a single entity (e.g., within a single housing) for the purposes of illustration, in other examples, controller 110 may include two or more discrete physical systems (e.g., within two or more discrete housings). Controller 110 may include interface 210, processor 220, and memory 230. Controller 110 may include any number or amount of interface(s) 210, processor(s) 220, and/or memory(s) 230.

Controller 110 may include components that enable controller 110 to communicate with (e.g., send data to and receive and utilize data transmitted by) devices that are external to controller 110. For example, controller 110 may include interface 210 that is configured to enable controller 110 and components within controller 110 (e.g., such as processor 220) to communicate with entities external to controller 110. Specifically, interface 210 may be configured to enable components of controller 110 to communicate with external device 120, messaging server 130, or the like. Interface 210 may include one or more network interface cards, such as Ethernet cards and/or any other types of interface devices that can send and receive information. Any suitable number of interfaces may be used to perform the described functions according to particular needs.

As discussed herein, controller 110 may be configured to manage communication of applications 122, 138 using control message 134 of queue 132. Controller 110 may utilize processor 220 to thusly manage communication. Processor 220 may include, for example, microprocessors, digital signal processors (DSPs), application specific integrated circuits (ASICs), field-programmable gate arrays (FPGAs), and/or equivalent discrete or integrated logic circuits. Two or more of processor 220 may be configured to work together to manage communication accordingly.

Processor 220 may manage communication of shared control message 134 according to instructions 232 stored on memory 230 of controller 110. Memory 230 may include a computer-readable storage medium or computer-readable storage device. In some examples, memory 230 may include one or more of a short-term memory or a long-term memory. Memory 230 may include, for example, random access memories (RAM), dynamic random-access memories (DRAM), static random-access memories (SRAM), magnetic hard discs, optical discs, floppy discs, flash memories, forms of electrically programmable memories (EPROM), electrically erasable and programmable memories (EEPROM), or the like. In some examples, processor 220 may manage communication of shared control message 134 as described herein according to instructions 232 of one or more applications (e.g., software applications) stored in memory 230 of controller 110.

In addition to instructions 232 in some examples gathered or predetermined data or techniques or the like as used by processor 220 to manage communication of shared control message 134 as described herein may be stored within memory 230. For example, memory 230 may include information described above that is gathered from external devices 120 and/or messaging server 130. For example, as depicted in FIG. 2, memory 230 may include control message data 236 and thread data 238 as gathered from messaging server 130 and stored on tables 112 as table data 234. As depicted, memory 230 may include many sets of table data 234, such as one or more tables for each of control messages 134 that controller 110 is managing communication for.

Control message data 236 may include data on whether or not respective control messages 134 for respective queues 132 have been generated, whether or not respective control messages 134 are currently available within queue 132 or are being edited by one of threads 136, or other such information. Similarly, table data 234 may include thread data 238, which may include data such as how long of a wait period a "get" call a respective thread 136 has in accessing control message 134, whether or not threads 136 are scheduled to edit control message 134 during a future time window, whether or not each of threads 136 has opted into "callback functionality in which controller 110 actively delivers control message 134 to the respective threads 136 during their respective future time windows, or the like.

Memory 230 may further include machine learning techniques 240 that controller 110 may use to improve a process of managing communication of shared control message 134 as discussed herein over time. Machine learning techniques 240 can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques. Specifically, machine learning techniques 240 can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning algorithms.

Figure 3:
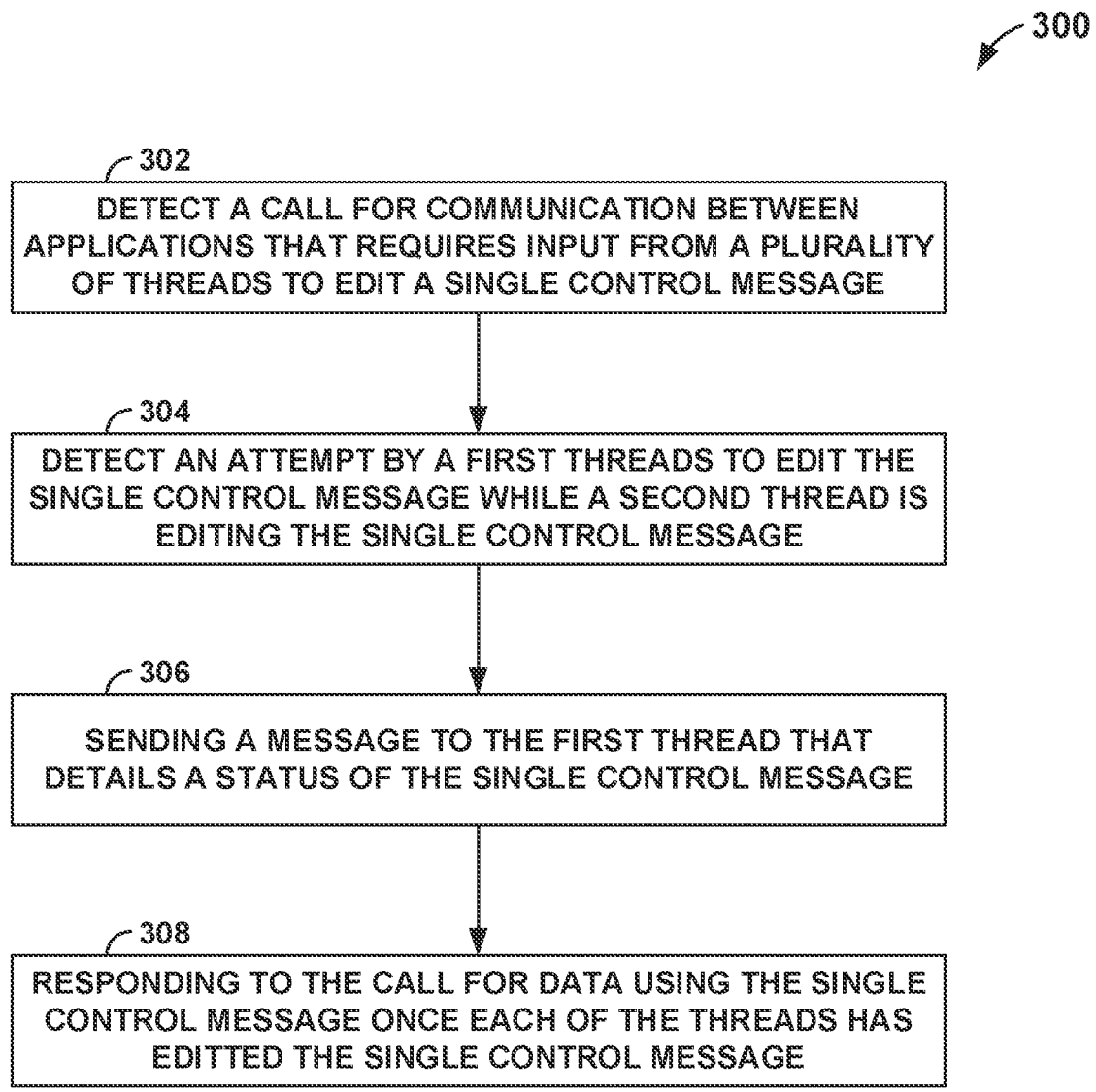
FIG. 3 depicts an example flowchart by which the controller of FIG. 1 may manage a shared control message.

Using these components, controller 110 may manage communication of applications in a shared messaging system as discussed herein. For example, controller 110 may manage communication according to flowchart 300 depicted in FIG. 3. Flowchart 300 of FIG. 3 is discussed with relation to FIG. 1 for purposes of illustration, though it is to be understood that other systems may be used to execute flowchart 300 of FIG. 3 in other examples. Further, in some examples controller 110 may execute a different method than flowchart 300 of FIG. 3, or controller 110 may execute a similar method with more or less steps in a different order, or the like.

Controller 110 detects a call for communication between applications 122, 138 (302). This call for communication requires input from applications 122, 138 via editing of a single control message 134 in queue 132. Control message 134 and queue are configured such that only one of threads 136 of applications 122, 138 can access and edit control message 134 at a time, after which the respective threads 136 place control message 134 back into queue 132 for the next of threads 136 to recall and edit. The call detected by controller 110 may indicate that control message 134 is requested to be updated to reflect data from each of a predetermined set of applications 122, 138.

In some examples, controller 110 may identify a number of threads 136 that are going to edit the single control message 134. For example, controller 110 may identify from the call for communication the number of threads 136 anticipated or requested to provide input to "finish" control message 134. In other examples, controller 110 may gather an affirmative opt-in from each of applications 122, 138 as to whether or not these applications 122, 138 will provide input to control message 134.

Controller 110 detects an attempt by a first thread 136A of threads 136 to access the single control message 134 while a second thread 136B of threads 136 is editing the single control message 134 (304). This attempt may include a request message that includes information from first thread 136A detailing a nature of this attempt. For example, controller 110 may determine that the attempt by the first thread 136A relates to an attempt to edit the single control message 134. In other examples (not depicted), controller 110 may determine that the attempt is to consume and delete the single control message 134 (e.g., that the access request is not a "putback" operation as primarily referenced herein). Beyond this, the attempt may include request information that details a length of time that the first thread 136A anticipates holding the single control message 134 request for (e.g., somewhere between 50 milliseconds and 400 milliseconds).

In some situations, controller 110 may be configured to actively release the single control message 134 at scheduled points in the future (e.g., provide to a respective thread 136 without that thread 136 executing another "get" call that immediately precedes controller 110 providing the control message 134, but is instead within a window of a previously received "get" call). In these situations, controller 110 may only schedule a future release of the single control message 134 to any given thread 136 in response to that thread explicitly opting-in to such an operation. For example, controller 110 may be configured to identify a "callback" flag within the request message from thread 136A that attempts to get access to single control message 134, where this flag indicates that thread 136A requests and is configured to receive a callback that includes the single control message 134 at a future time (e.g., where the controller 110 releases, and/or potentially affirmatively provides, the single control message 134 at a future time because the single control message 134 is not currently available).

In response to detecting the attempt by first thread 136A to access the single control message 134, controller 110 sends a message to the first thread 136A that details a status of the single control message 134 (306). As used herein, a status as provided by controller 110 may provide sufficient information such that the first thread 136A is able to gather more information towards the end of first thread 136A accessing and editing control message 134. For example, the status may include an indication that the single control message 134 has been created, or in other examples (not depicted in flowchart 300) the status may include an indication that the single control message 134 has not yet been created. Where the status includes an indication that control message 134 has not been created, thread 136A may create control message 134 and provide respective input to this created control message 134 (not depicted in flowchart 300). In some examples (not depicted), the status includes an indication that the control message 134 is currently available (e.g., is created and is in queue 132 and is not currently being accessed by other threads 136), in response to which first thread 136A would access and edit the single control message 134.

In other examples, controller 110 may provide a status with an indication that the single control message 134 is being edited by one of the plurality of threads 136 (and/or specifically that the control message 134 is being edited by second thread 136B). For example, controller 110 may maintain table 112 that details whether or not control message 134 is being accessed by any (and if so, which of the plurality of) threads 136. Specifically, in some cases controller 110 may maintain table 112 that includes entries (e.g., a single row) for each of a plurality of control messages similar to the single control message 134, where this table 112 is maintained by controller 110 to include the single thread 136 (if any) that is accessing the respective control message 134. As would be understood by one of ordinary skill in the art, threads 136, by nature of being single and small series of instructions to be managed independently by a scheduler, relate to one specific and single control message 134, such that each control message 134 within table 112 should be understood to be accessed and updated by a discrete set of threads 136. Thus, controller 110 would update such a version of table 112 to show that the single control message 134 was in use when thread 136B was accessing it, and then update table 112 to show that the single control message 134 was available when single control message 134 was in queue 132 (e.g., when none of threads 136 were accessing/editing single control message 134).

In some examples, the status provided by controller 110 includes a notification of a first future time window in which the first thread 136A is directed to edit the single control message 134. For example, controller 110 may calculate an ongoing time window required for the second thread 136B to conclude editing the single control message 134. Controller 110 may calculate this ongoing time window by identifying a specific point in time (e.g., down to a millisecond) in which the second thread 136B initially accessed the single control message 134, and adding to this initial time a maximum expected time (as provided by second thread 136B as described herein) which second thread 136B will take to edit (and return) the single control message 134. Where controller 110 determines that the first thread 136A is the only of the plurality of threads 136 to attempt to edit the single control message 134 while the second thread 136B is editing the single control message 134, controller 110 may calculate the first future time window to be a period of time that immediately follows the ongoing time window. Specifically, controller 110 may calculate this first future time window to be a period of time of a duration that equals the maximum expected time (as provided by first thread 136A) for which first thread 136A will hold the single control message 134 as specified by the "get" call.

As described herein, in some examples the first thread 136A may have indicated (e.g., indicated within a request/attempt to access single control message 134 from queue 132) that the first thread 136A is configured to receive single control message 134 directly from controller 110. For example, the first thread 136A may have indicated this by affirmatively marking a field regarding a callback option (e.g., where another of threads 136 may functionally indicate callbacks as not being an option by leaving this field blank, or leaving a null value in this field, or the like). In such examples, where the first thread 136A is scheduled for the first future time window, controller 110 may release/free the single control message 134 to/for the first thread 136 once the second thread 136B is finished with it and the first future time window has begun.

Controller 110 may document and track threads 136 that have requested but not yet received access to control message 134 (and/or have scheduled future time windows for accessing control message 134) in table 112. As discussed herein, controller 110 may use a different table 112 than the table 112 that is used to document which one (if any) of threads 136 is accessing the single control message 134. For example, controller 110 may maintain a table that includes one or more future time windows, and/or any unscheduled threads 136 that have requested access to control message 134 but are not yet scheduled for any reason. In some examples, controller 110 may delete entries once they relate to an event from the past, such that table 112 regarding future scheduling of threads 136 accessing control message 134 substantially only includes data regarding future events.

In this way controller 110 may manage all threads 136 as they access and edit/update the single control message 134. For example, controller 110 may detect an attempt by third thread 136C to edit the single control message 134 while the second thread 136B is still editing the single control message 134, but controller 110 may detect this attempt by third thread 136B subsequent to detecting the attempt by the first thread 136A to edit the single control message 134. In this example, controller 110 may determine that the first thread 136A and the third thread 136C are the only two of the plurality of threads 136 to have thus far attempted to edit the single control message 134 while the second thread 136B is editing the single control message 134. In response to this determination, controller 110 may calculate a second future time window that immediately follows the first future time window, and/or therein send a message to the third thread 136C that includes a notification of the second future time window (or otherwise plan to let the third thread 136C access control message 134 if third threads 136C "get" call is still active during this time.

In some examples, controller 110 may determine that one of threads 136 is stalling out with control message 134, such that controller 110 functionally boots out this thread 136 to move this process along. For example, controller 110 may detect that the first future time window has expired and the first thread 136A is still editing the single control message 134 (e.g., such that the first thread 136A has not returned control message 134 to queue 132). In response to this determination, controller 110 may block the first thread 136A from returning the single control message 134 to the queue 132 and release/free the single control message 134 to/for third thread 136C. In some examples, controller 110 may send a status to first thread 136A from which first thread 136A may identify that first thread 136 is currently being blocked from returning its current edits, and that first thread 136A must re-access the single control message 134 in the future (e.g., via a subsequent "get" call) in order to edit the single control message 134. In response to this, first thread 136A may send in a new request to access the single control message 134, upon which controller 110 may restart may again evaluate whether single control message 134 is currently being evaluated and whether first thread 136A may access it, or the like.

Once this process is complete, controller 110 responds to the call for data using the single control message 134 (306). For example, as discussed above controller 110 may identify a number of threads 136 that are designated to access and update/edit control message 134, such that when each (or a threshold number/percentage) of this number of threads 136 has successfully accessed and returned control message 134, controller 110 may cause a finalized updated version of control message 134 (e.g., a version that has been updated by threads 136 to reflect data/input from each of relevant applications 122, 138) to be used to respond to the call for data. As would be understood by one of ordinary skill in the art, responding to the call for data may include providing data of the (now updated) control message 134 to the respective "sender application" that initially put out the call for communication.

Figure 4:
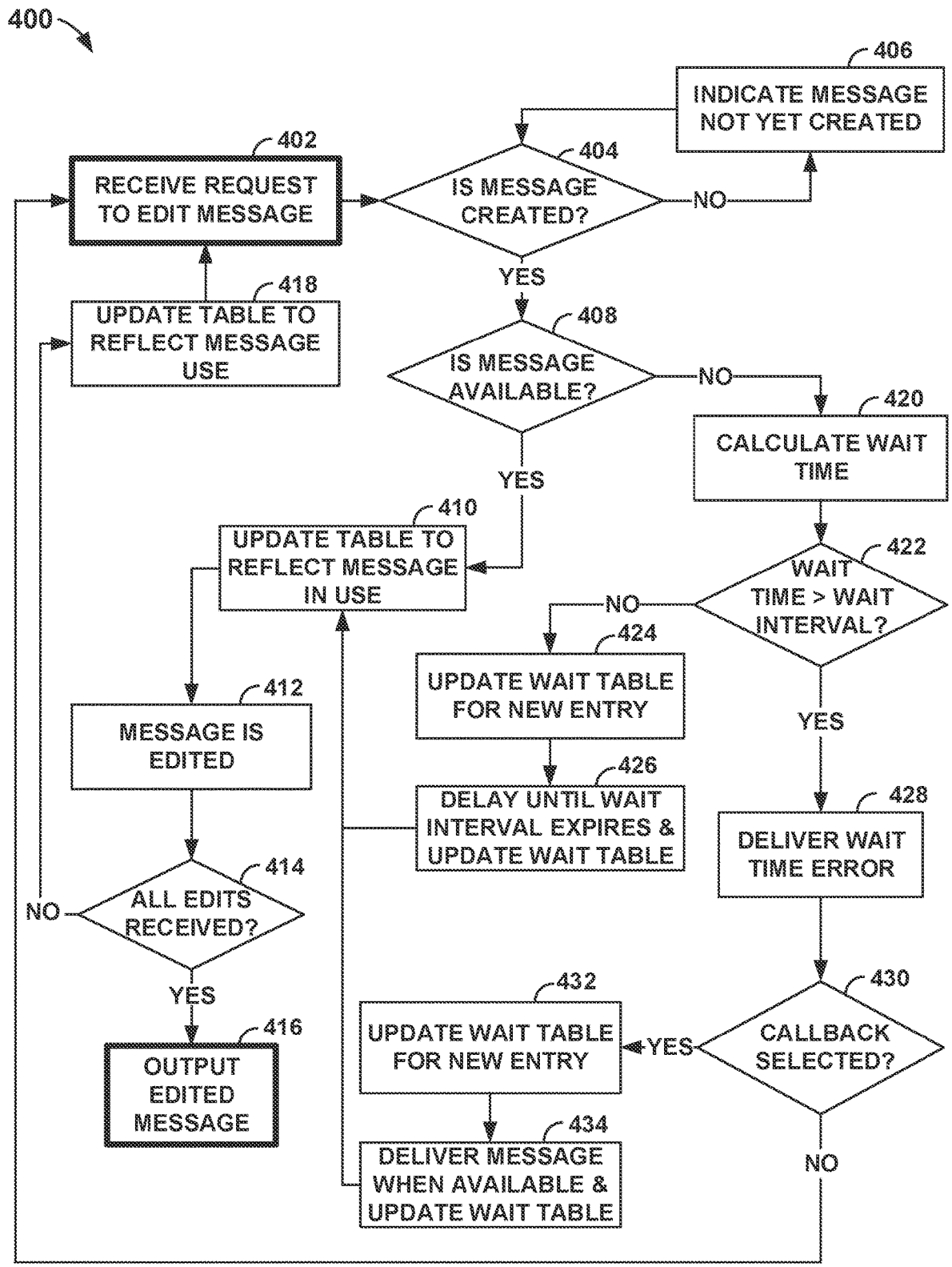
FIG. 4 depicts an example flowchart by which the controller of FIG. 1 may use one or more tables to manage a shared control message by indicating when a message is being edited by a thread and scheduling future threads.

As described above, in some examples controller 110 may utilize multiple tables 112 to manage communication of a shared control message 134. For example, controller 110 may manage communication according to flowchart 400 depicted in FIG. 4, which can generally be understood to relate to a specific implementation of this disclosure. Specifically, this implementation includes one of the processing threads 136 requesting control message 134 from queue 132 in a manner that informs controller 110 whether the respective processing threads 136 will put control message 134 back in queue 132 after modification, while also informing controller 110 of a planned maximum amount of time that the respective processing thread 136 will hold control message 134 for processing before putting control message 134 back upon editing/modification. Further, as described herein, the respective thread 136 may also select to opt-in to an optional callback function in which controller 110 delivers control message 134 to the requesting respective thread 136 once control message 134 become available. Flowchart 400 of FIG. 4 is discussed with relation to FIG. 1 for purposes of illustration, though it is to be understood that other systems may be used to execute flowchart 400 of FIG. 4 in other examples. Further, in some examples controller 110 may execute a different method than flowchart 400 of FIG. 4, or controller 110 may execute a similar method with more or less steps in a different order, or the like. Flowchart 400 may be thought of as generally starting with box 402 and ending with box 416 (the two bolded boxes), but a successful operation may include a great number of loops across/within flowchart 400 between starting at 402 and ending at 416.

A request may be received to edit control message 134 (402). Controller 110 may detect this message as received by messaging server 130. This request may be a "get" call from thread 136A. For example, the "get" call may be in a format of: Consumer.get(msgDetails, READ_FOR_PUTBACK, MaxExpectedHoldingTime, waitInterval, callBackFn), where "Consumer.get" includes functional language to invoke/navigate the API, "msgDetails" includes details of the message that the thread is interested in and/or an identification alphanumeric code that uniquely identifies control message 134 (said identification number referred to as the "msgid"), "READ_FOR_PUTBACK" indicates to controller 110 that thread 136A is requesting to gather/read/modify control message 134 and subsequently put it back in queue 132 (e.g., rather than delete it), "MaxExpectedHoldingTime" indicates a maximum amount of time (e.g., in milliseconds) that thread 136A will continue holding while requesting (and then accessing) control message 134 from queue 132 before putting control message 134 back in queue 132 (or otherwise ending a request for control message 134), "waitInterval" indicates how long the client controlling thread 136A will wait until (and/or can be blocked from) sending a subsequent "get" call (e.g., a call that precedes the immediate "get" call currently being received/analyzed) in the event that the immediate "get" call does not result in thread 136A getting access to control message 134, and "callBackFn: refers to whether or not thread 136A is opting-in to an optional callback function in which controller 110 delivers control message 134 to thread 136A if the control message 134 is not available within the specified waitInterval.

In response to receiving this request, controller 110 determines whether or not control message 134 identified by the request is created (404). Controller 110 may check the respective queue 132 to see if this control message 134 is within this queue 132. If control message 134 is not within this queue 132, controller may check tables 112 to see if control message 134 is being used by a different one of threads 136.

Controller 110 may maintain two tables 112, one of which is referred to herein as MESSAGES_IN_USE table 112. MESSAGES_IN_USE table 112 includes details about a current status of the single (or perhaps many, in situations where controller 110 has a one-to-many relationship with)

control message(s) 134. For example, MESSAGES_I-N_USE table 112 may include details on control message(s) 134 for which respective threads 136 request access with "READ_FOR_PUTBACK" selected. An example of the MESSAGES_IN_USE table 112 is depicted below with a list of all current control messages that are currently managed by controller 110 and accessed by one or more threads 136 in different processes, where "threadId" includes an identifying alphanumeric code that uniquely identifies respective threads 136 and readTime includes a respective real-world time at which respective threads 136 gain access to a respective single control message 134. In some examples, as depicted, control message 134 of FIG. 1 (which is identified as Msg 134 within the tables below) is not in MESSAGES_IN_USE table 112 as a result of control message 134 not currently being access by any threads 136.

| msgId  | threadId  | readTime     | MaxExpectedHoldingTime |
|--------|-----------|--------------|------------------------|
| MsgABC | threadABC | 12:30:45.250 | 400                    |
| MsgDEF | threadDEF | 12:30:45.225 | 300                    |
| MsgGHI | threadGHI | 12:30:45.200 | 250                    |

If, as depicted above, the MESSAGES_IN_USE table 112 indicates that none of threads 136 are currently using control message 134 (e.g., as indicated by there not being a current Msg 134 row within MESSAGES_IN_USE table 112, and/or in other examples as indicated by a respective "thread" field having the value NA on a row for Msg 134) while simultaneously control message 134 is not in queue 132, controller 110 may determine that control message 134 has not yet been created ("NO" branch from 404). In response to this controller 110 may indicate that control message 134 has not yet been created (406). For example, controller 110 may return a status of "NO MSG CREATED." In some examples, thread 136A may continue waiting in a loop 404-406 checking for control message 134 to be created (e.g., created by controller 110, or created by one of applications 122, 138, or created by some component of messaging server 130, or the like), though in other examples thread 136A may itself create control message 134 and place this control message 134 in queue 132.

Once control message 134 generated and in queue 132, controller 110 identifies that control message 134 is created ("YES" branch from 404"). In other examples, as described above, controller 110 may alternatively/additionally identify that control message 134 is created via identifying that MESSAGES_IN_USE table 112 indicates that control message 134 is currently being used/edited by a different thread 136.

Once controller 110 identifies that control message 134 is created, controller 110 determines whether or not control message 134 is currently available (408). Controller 110 may determine that control message 134 is available by checking whether or not control message 134 is currently in queue 132. If controller 110 identifies that control message 134 is available ("YES" route from 408"), controller updates MESSAGES_IN_USE table 112 as below to reflect that thread 136A is using control message 134 (410).

| msgId  | threadId | readTime     | MaxExpectedHoldingTime |
|--------|----------|--------------|------------------------|
| Msg134 | 136A     | 12:30:45.500 | 300                    |

Controller 110 may also enable thread 136A to use/edit control message 134 (412) in response to identifying that control message 134 is available. Following the edit, controller 110 determines whether or not all edits have been received (414). For example, controller 110 may determine whether or not a number of threads 136 that were identified as required to edit control message 134 matched a number of threads 136 that have (e.g., as of readTime) edited control message 134. If all edits are received ("YES" branch from 414), controller 110 outputs the finalized edited control message 416. If all edits have not yet been received ("NO" branch from 414), controller 110 updates tables 112 to reflect that thread 136A is no longer accessing control message 134 (418).

In many examples, numerous threads 136 may be at different places of flowchart at a time. For example, while thread 136A was at editing control message 134 (e.g., at 412), controller 110 may have received a request from thread 136B to edit control message 134 (402). Given that control message 134 is accessed by thread 136A in this scenario, controller 110 checks MESSAGES_IN_USE table 112 and queue 132 to determine that control message 134 is created ("YES" branch from 404) but control message 134 is not available ("NO" branch from 408). In response to this determination, controller 110 calculates a wait time for thread 136B to access control message 134 (420). Controller 110 may calculate the wait time as the readTime of the MESSAGES_IN_USE table 112 when added to the MaxExpectedHoldingTime, further added to any potential MaxExpectedHoldingTime(s) of potential other waiting threads 136, subtracted by the request time of the current thread 136.

For example, controller 110 may check another of tables 112 maintained by controller 110, such as a MESSAGE_WAITING_THREADS table 112 that includes details about which threads are waiting for access to control message 134 that is listed in the MESSAGES_IN_USE table 112, such as the one provided below.

| threadId | msgId  | requestTime | MaxExpectedHoldingTime | callBackFunction |
|----------|--------|-------------|------------------------|------------------|
| NA       | Msg134 | NA          | NA                     | NA               |

As depicted here, for control message 134, there are no other threads 136 that are currently waiting for access, such that the only delay is due to thread 136A currently accessing control message 134. If the request for thread 136B was 12:30:45.600, controller 110 may therefore calculate a wait time of [12:30:45.500]+[300 milliseconds]-[12:30:45.600], for a wait time of 200 milliseconds.

Controller 110 may determine whether or not the calculated wait time is greater than the wait interval (422). As stated above, the wait interval may be the duration that respective threads 136 will wait until (and/or the duration during which threads 136 can be blocked from) sending a subsequent "get" call to attempt to try to get access to control message 134. Therefore, determining whether or not the calculated wait time is greater than the wait interval is similar to seeing whether or not control message 134 will become available to thread 136B prior to a next point in time at which thread 136B can again request access to control message 134.

If controller 110 determines that the wait time is shorter than the wait interval ("NO" branch from 422), controller 110 updates the MESSAGE_WAITING_THREADS table 112 to reflect this request from thread 136B (424). For example, controller 110 updates MESSAGE_WAITING_THREADS table 112 to reflect thread 136B waiting for control message 134 in a manner as depicted below:

| threadId | msgId | requestTime | MaxExpectedHoldingTime | callBackFunction |
|---|---|---|---|---|
| 136B | Msg134 | 12:30:45.600 | 100 | onMessage( ) |

As depicted here, controller can update MESSAGE_WAITING_THREADS table 112 to reflect data of a request of thread 136B, such as a MaxExpectedHoldingTime of 100 milliseconds and that thread 136B opted in to a callback when control message 134 is available for access.

After updating MESSAGE_WAITING_THREADS table 112, controller 110 may delay until the wait time expires and subsequently update MESSAGE_WAITING_THREADS table 112 to remove thread 136B (426), after which controller 110 may update MESSAGES_IN_USE table 112 (410) to indicate that thread 136B is accessing single control message 134 (412.

If controller 110 determines that this wait time is longer than the wait interval ("YES" branch from 422), controller 110 may provide a status to thread 136B of an error in which thread 136B will not be able to access control message 134 in this wait interval (428). This error may provide such information as expectedWaitTime data, and/or that the message has been created and is currently in use by another of threads 136. Following this, controller 110 may determine whether or not callback is selected for thread 136B (430). For example, controller 110 may check the request to access control message 134 that came from thread 136B to verify whether or not thread 136B affirmed callback. Where thread 136B did select callback ("YES" branch from 430), controller 110 may update MESSAGE_WAITING_THREADS table 11 to reflect that thread 136B is waiting for access (432) and then subsequently actively deliver control message 134 to thread 136B for editing (434). As depicted, as soon as control message 134 is delivered to thread 136B, controller 110 may also update MESSAGES_IN_USE table 112 to reflect this delivery (410). Where thread 136B did not select callback ("NO" branch from 430), controller 110 instead ends the "get" call to avoid thread 136B wasting time. Upon ending the "get" call in this fashion, flowchart 400 returns to receiving a next request to edit control message 134 (e.g., such as perhaps thread 136B submitting a subsequent request).

In this way, controller 110 may be configured to only inform thread 136B of a future point in time (e.g., a non-instantaneous point in time) at which thread 136B is to achieve access to control message 134 in situations where, without this notification, thread 136B would send another request that would clutter network traffic, take processing power, and the like. By only informing thread 136B of such a delay in situations where failing to inform thread 136B of this delay would cause thread 136B to fruitlessly attempt to get access to thread 136B, controller 110 may itself reduce network traffic that it is expending and processing power that it is requiring.

To continue this example, imagine that as thread 136B is accessing control message 134, each of threads 136D, 136E, and 136F requested access to control message 134 at functionally the same time of 12:30:45.850 but in the order below with the requests below: thread 136D-get(Msg1, READ_FOR_PUTBACK, 400, 200, onMessage) thread 136E-get(Msg1, READ_FOR_PUTBACK, 300, 200, NULL) thread 136F-get(Msg1, READ_FOR_PUTBACK, 200, 200, onMessage) Given that when these requests were received (402) that control message 134 was created ("YES" branch from 404) but unavailable ("NO" branch from 408), controller 110 may determine that none can be immediately processed. Controller 110 may determine that a wait time for thread 136D is greater than a wait interval ("YES" branch from 422). Specifically, controller 110 may determine that the remaining time of currently processing thread 136B (e.g., as calculated from the readTime, MaxExpectedHoldingTime, and currentTime) is 50 milliseconds (12:30: 45.800+100 millisecond–12:30:45.850=50 millisecond), which is less than the waitTime of 200 milliseconds.

Accordingly, within MESSAGE_WAITING_THREADS table 112, an entry for thread 136D is reflected below:

| threadId | msgId | requestTime | MaxExpectedHoldingTime | callBackFunction |
|---|---|---|---|---|
| 136D | Msg134 | 12:30:45.850 | 400 | onMessage( ) |

Similarly, controller 110 may calculate a wait time for thread 136E (420) and determine that the wait time is less than the wait interval ("YES" branch at 422), as thread 136E could only access control message 134 after both thread 136B and 136D access and modify control message 134. Controller 110 may therein deliver a status of a wait time error (428) and further determine that callback is not selected ("NO" branch at 430). In a conventional system, this thread would wait for 200 milliseconds (e.g., its max expected holding time) before the "get" call is returned with a result of "no message available" with no context, leaving the thread with little to work off of. Conversely, even in this example where thread 136E is not able to access control message 134 or schedule a future time in which control message 134 is available, controller 110 may still provide a status from which thread 136E can identify that control message 134 is created and being edited by threads 136 (where this status as provided by controller 110 also potentially includes an expectedWaitTime). Further, even in this example where thread 136E is not able to access control message 134 of schedule a future time, controller 110 is still configured to provide an immediate return that does not include the "get" call being blocked, improving performance of computing devices of environment 100.

For thread 136F, controller 110 determines that a calculated wait time (at 420) is greater than the wait interval ("YES" branch at 422), similar as to threads 136D, 136E. Further, controller 110 determines that thread 136F specified a callback function ("YES" branch at 430), such that controller 110 adds thread 136F to MESSAGE_WAITING_THREADS table 112 (432), as per the below:

| threadId | msgId | requestTime | MaxExpectedHoldingTime | callBackFunction |
|---|---|---|---|---|
| 136D | Msg134 | 12:30:45.850 | 400 | onMessage( ) |
| 136F | Msg134 | 12:30:45.850 | 200 | onMessage( ) |

Further, both thread 136D and 136F will, by virtue of the elected callback functionality, have control message 134 delivered to them (434) when it becomes available. Once controller 110 sends control message 134 to either via callback, controller 110 will update MESSAGE_WAITING_
THREADS table 112 by removing the respective row relating to this thread 136, update MESSAGES_IN_USE table 112 to reflect the current accessing of control message 134 by the respective thread 136, and enable the edit of control message 134 by the respective thread 136.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-situation data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   detecting a call for communication between applications that requires input from a plurality of threads of the applications via editing of a single control message in a queue such that the single control message reflects data from each of the applications; and
   managing multiple concurrent requests from the plurality of threads to edit the single control message via scheduling future time windows based on a current set of concurrent requests, wherein the managing also includes:
      detecting an attempt by a first thread of the plurality of threads to edit the single control message while a second thread of the plurality of threads is editing the single control message;
      calculating an ongoing time window required for the second thread to conclude editing the single control message;
      determining that only the first thread is attempting to edit the single control message while the second thread is editing the single control message;
      calculating a first future time window that immediately follows the ongoing time window in response to determining that the first thread is the only of the plurality of threads to attempt to edit the single control message while the second thread is editing the single control message;
      sending a message to the first thread that details a status of the single control message in response to detecting the attempt, wherein the status includes a notification of the first future time window in which the first thread is directed to edit the single control message; and
      responding to the call for data using the single control message in response to detecting that each of the plurality of threads has edited the single control message.

2. The computer-implemented method of claim 1, wherein the status includes an indication that the single control message has been created.

3. The computer-implemented method of claim 1, wherein the status includes an indication that the single control message is being edited by one of the plurality of threads.

4. The computer-implemented method of claim 3, further comprising:
   maintaining a table that includes the indication that the single control message is being edited by the one of the plurality of threads; and
   updating the table to indicate that the single control message is not being edited by any of the plurality of threads in response to detecting that the single control message is within the queue.

5. The computer-implemented method of claim 1, wherein the status includes an indication that the single control message has not been created.

6. The computer-implemented method of claim 1, further comprising identifying a number of the plurality of threads that are going to edit the single control message, wherein the responding to the call is in response to detecting that each of the number of the plurality of threads has edited the single control message.

7. The computer-implemented method of claim 1, wherein the attempt by the first thread includes details on a manner in which the first thread will interact with the single control message in response to the first thread being given access with the single control message, wherein the details include the first thread planning to put the single control message back after editing rather than permanently delete the single control message.

8. The computer-implemented method of claim 1, further comprising releasing the single control message to the first thread during the first future time window in response to determining that an amount of time for the single control message to become available is greater than a predetermined holding time of the attempt by the first thread to edit the single control message.

9. The computer-implemented method of claim 1, wherein the managing multiple concurrent requests to edit the single control message via scheduling the future time windows based on the current set of concurrent requests further comprises:
   detecting an attempt by a third thread of the plurality of threads to edit the single control message while the second thread is editing the single control message subsequent to detecting the attempt by the first thread to edit the single control message;
   determining that only the first thread and the third thread of the plurality of threads are attempting to edit the single control message while the second thread is editing the single control message;
   calculating a second future time window that immediately follows the first future time window in response to determining that the first thread and the third thread of the plurality of threads are the only two of the plurality of threads to attempt to edit the single control message while the second thread is editing the single control message; and sending a message to the third thread that includes a notification of the second future time window in which the third thread is directed to edit the single control message.

10. The computer-implemented method of claim 9, wherein the managing multiple concurrent requests to edit the single control message via scheduling the future time windows based on the current set of concurrent requests further comprises:

detecting that the first future time window has expired and the first thread is still editing the single control message;

releasing the single control message to the third thread;

blocking the first thread from returning edits to the single control message to the queue; and sending an update message to the first thread that includes a notification of a new future time window.

11. The computer-implemented method of claim 9, further comprising maintaining a table that includes each of the status, the ongoing time window, the first future time window, and the second future time window.

12. A system comprising:

a processor; and a memory in communication with the processor, the memory containing instructions that, when executed by the processor, cause the processor to:

detect a call for communication between applications that requires input from a plurality of threads of the applications via editing of a single control message in a queue such that the single control message reflects data from each of the applications; and manage multiple concurrent requests from the plurality of threads to edit the single control message via scheduling future time windows based on a current set of concurrent requests, wherein the managing also includes causing the processor to:

detect an attempt by a first thread of the plurality of threads to edit the single control message while a second thread of the plurality of threads is editing the single control message;

calculate an ongoing time window required for the second thread to conclude editing the single control message;

determine that only the first thread is attempting to edit the single control message while the second thread is editing the single control message;

calculate a first future time window that immediately follows the ongoing time window in response to determining that the first thread is the only of the plurality of threads to attempt to edit the single control message while the second thread is editing the single control message;

send a message to the first thread that details a status of the single control message in response to detecting the attempt, wherein the status includes a notification of the first future time window in which the first thread is directed to edit the single control message; and respond to the call for communication using the single control message in response to detecting that each of the plurality of threads has edited the single control message.

13. The system of claim 12, the memory containing further instructions that, when executed by the processor, cause the processor to:

maintain a table that includes an indication that the single control message is being edited by one of the plurality of threads; and update the table to indicate that the single control message is not being edited by any of the plurality of threads in response to detecting that the single control message is within the queue.

14. The system of claim 12, wherein the status includes an indication that the single control message is being edited by one of the plurality of threads.

15. A computer program product, the computer program product comprising a computer readable storage medium having program instructions embodied therewith, the program instructions executable by a computer to cause the computer to:

detect a call for communication between applications that requires input from a plurality of threads of the applications via editing of a single control message in a queue such that the single control message reflects data from each of the applications; and manage multiple concurrent requests from the plurality of threads to edit the single control message via scheduling future time windows based on a current set of concurrent requests, wherein the managing also includes causing the computer to:

detect an attempt by a first thread of the plurality of threads to edit the single control message while a second thread of the plurality of threads is editing the single control message;

calculate an ongoing time window required for the second thread to conclude editing the single control message;

determine that only the first thread is attempting to edit the single control message while the second thread is editing the single control message;

calculate a first future time window that immediately follows the ongoing time window in response to determining that the first thread is the only of the plurality of threads to attempt to edit the single control message while the second thread is editing the single control message;

send a message to the first thread that details a status of the single control message in response to detecting the attempt, wherein the status includes a notification of the first future time window in which the first thread is directed to edit the single control message; and respond to the call for communication using the single control message in response to detecting that each of the plurality of threads has edited the single control message.

16. The computer program product of claim 15, wherein the status includes an indication that the single control message has been created and is being edited by one of the plurality of threads.

17. The computer program product of claim 15, the computer readable storage medium containing further instructions that, when executed by the computer, cause the computer to:

maintain a table that includes an indication that the single control message is being edited by one of the plurality of threads; and update the table to indicate that the single control message is not being edited by any of the plurality of threads in response to detecting that the single control message is in the queue.

* * * * *